Patented June 30, 1925.

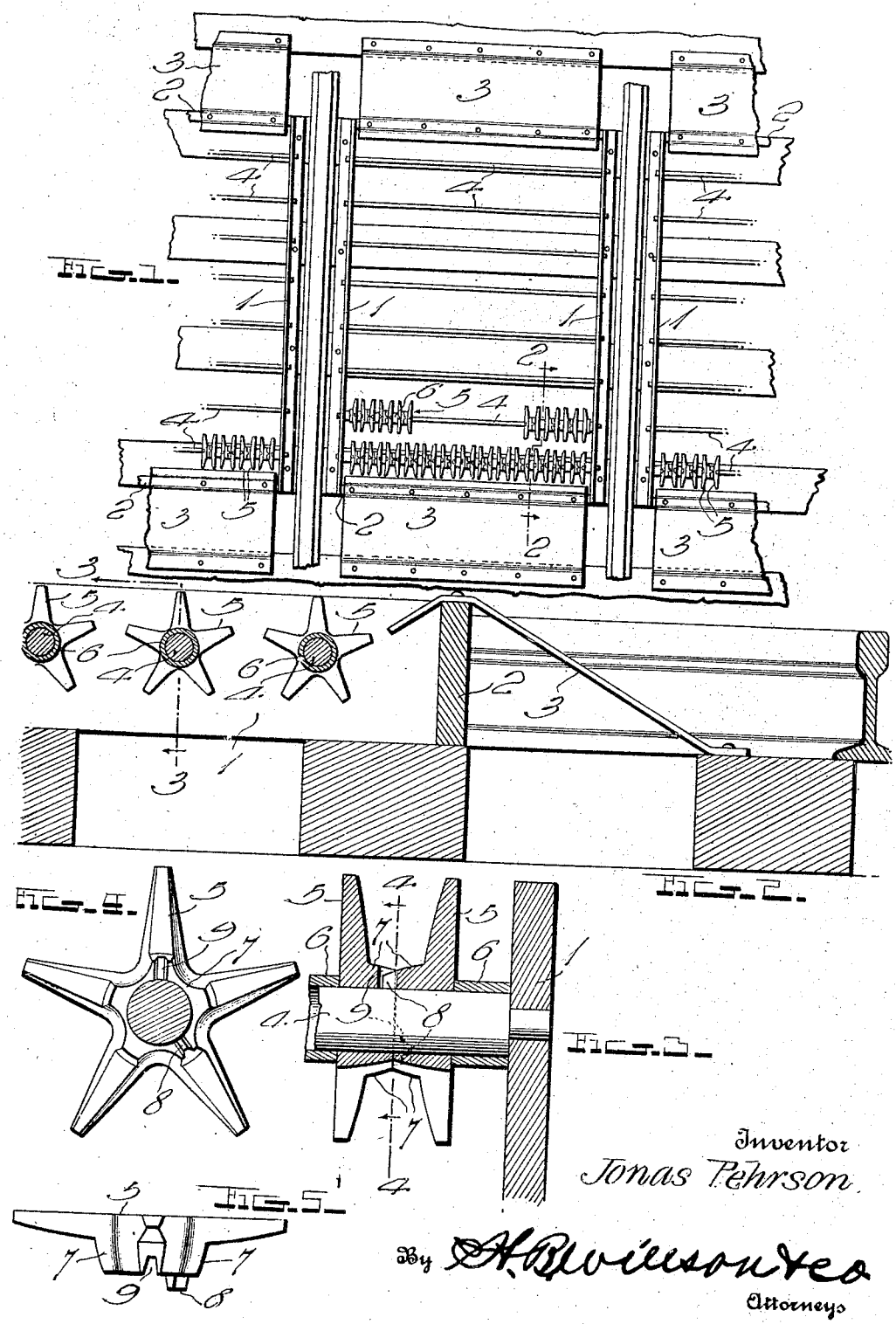

1,543,790

UNITED STATES PATENT OFFICE.

JONAS PEHRSON, OF WINNIPEG, MANITOBA, CANADA, ASSIGNOR OF ONE-FOURTH TO FREDERIK O. ZICKERMAN, OF WINNIPEG, CANADA.

CATTLE GUARD.

Application filed September 9, 1924. Serial No. 736,702.

*To all whom it may concern:*

Be it known that I, JONAS PEHRSON, a citizen of the Dominion of Canada, residing at Winnipeg, in the Province of Manitoba and Dominion of Canada, have invented certain new and useful Improvements in Cattle Guards; and I do declare the following to be a full, clear, and exact description of the invention, such as will enable others skilled in the art to which it appertains to make and use the same.

My invention relates to improvements in guards to prevent cattle from walking upon railways, the principal object being to provide a simple, inexpensive and durable device which will be highly efficient and will present no rigid portions upon which the cattle may tread.

In carrying out the above end, I make use of a plurality of horn wheels carried by parallel shafts which are in turn supported by an appropriate frame, a further object being to have the horn wheels free for rotation upon the shafts, wheels at different points along any shaft being relatively rotatable also, so that engagement of one hoof with certain wheels of any shaft cannot hold other wheels of said shaft against rotation.

A still further object is to provide a construction in which the horn wheels are disposed in pairs, the wheels of each pair being interlocked for rotation together.

With the foregoing in view, the invention resides in the novel subject matter hereinafter described and claimed, the description being supplemented by the accompanying drawing.

Figure 1 is a plan view illustrating three of the guards installed upon a railway.

Figure 2 is an enlarged detail vertical sectional view on line 2—2 of Fig. 1.

Figure 3 is a further enlarged detail section on line 3—3 of Fig. 2.

Figure 4 is a vertical sectional view on line 4—4 of Fig. 3.

Figure 5 is an edge view of the horn wheel shown in Fig. 4.

Three of the guards have been indicated in Fig. 1, but as their construction is all the same, only one will be described. The numerals 1 designate parallel side bars connected by suitable end bars 2, to form a base frame, said side bars being preferably formed of angle metal spiked or otherwise secured to the usual ties of the railway, while the end bars 2 may either be of wood or metal. Appropriate guard plates 3 extend from the upper edges of the bars 2 to adjacent ties, and having their ends supported by the side bars 1, are a number of parallel shafts 4, upon which horn wheels 5 are rotatably mounted. These wheels are preferably disposed in pairs and the numerous pairs are spaced apart by appropriate sleeves 6 on the shafts 4. The wheels 5 of each pair are provided with inwardly extending integral hubs 7, each of which is preferably provided with a projecting tooth 8 and a notch 9, the tooth of each hub being received in the notch of the other hub, so that the two wheels are interlocked for rotation as a single unit, although it will be understood that any pair of the horn wheels may rotate freely with respect to any other pair.

By providing the construction shown and described or a substantial equivalent thereof, a cattle guard is provided which is simple, inexpensive, easy to install, and very efficient there being no stable parts of the device upon which cattle or the like may tread.

As excellent results are obtainable from the details disclosed, they are preferably followed, but within the scope of the invention as claimed, numerous modifications may be made.

I claim:

1. A cattle guard comprising a frame, parallel shafts supported by said frame, horn wheels disposed in pairs on said shafts and free to rotate thereon, and means on the shafts spacing the individual pairs of horn wheels from each other, the wheels of each pair being provided with inwardly extending hubs having interlocking engagement with each other.

2. A cattle guard comprising a frame, parallel shafts supported by said frame, horn wheels disposed in pairs on said shafts and free to rotate thereon, and means on the shafts spacing the individual pairs of horn wheels from each other, the wheels of each pair being provided with inwardly extending hubs, one of which is formed with a notch while the other is provided with a tooth received in said notch to interlock two wheels for rotation as a single unit.

In testimony whereof I have hereunto affixed my signature.

JONAS PEHRSON.